(12) United States Patent
Panara et al.

(10) Patent No.: US 10,830,281 B2
(45) Date of Patent: Nov. 10, 2020

(54) METHOD FOR UNIFORMING TEMPERATURE IN A SHAFT SUPPORTED BY A FLUID BEARING, BEARING SYSTEM AND TURBOMACHINE

(71) Applicant: Nuovo Pignone Tecnologie Srl, Florence (IT)

(72) Inventors: Daniele Panara, Florence (IT); Leonardo Baldassarre, Florence (IT); Mirko Libraschi, Florence (IT); Antonio Pelagotti, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 0 days.

(21) Appl. No.: 15/759,840

(22) PCT Filed: Sep. 23, 2016

(86) PCT No.: PCT/EP2016/072684
§ 371 (c)(1),
(2) Date: Mar. 14, 2018

(87) PCT Pub. No.: WO2017/050965
PCT Pub. Date: Mar. 30, 2017

(65) Prior Publication Data
US 2018/0252267 A1    Sep. 6, 2018

(30) Foreign Application Priority Data

Sep. 25, 2015 (IT) .................. 102015000055511

(51) Int. Cl.
*F16C 37/00* (2006.01)
*F16C 17/24* (2006.01)
(Continued)

(52) U.S. Cl.
CPC .......... *F16C 37/002* (2013.01); *F16C 17/243* (2013.01); *F16C 33/1055* (2013.01); *F16C 17/02* (2013.01); *F16C 2360/00* (2013.01)

(58) Field of Classification Search
CPC .... F16C 37/00; F16C 37/002; F16C 33/1055; F16C 17/026; F16C 17/243; F16C 17/02; F16C 2360/00
See application file for complete search history.

(56) References Cited

U.S. PATENT DOCUMENTS

| | | | | |
|---|---|---|---|---|
| 531,748 | A | * | 1/1895 | Raymond ............... F16C 37/00 384/320 |
| 1,227,880 | A | * | 5/1917 | Brown .................... F16C 37/00 384/316 |

(Continued)

FOREIGN PATENT DOCUMENTS

| | | |
|---|---|---|
| CN | 1346943 A | 5/2002 |
| CN | 1789738 A | 6/2006 |

(Continued)

OTHER PUBLICATIONS

Jongh, F. D., "The Synchronous Rotor Instability Phenomenon-Morton Effect," Proceedings of the Thirty-seventh Turbomachinery symposium, pp. 159-167 (2008).

(Continued)

*Primary Examiner* — Alan B Waits
(74) *Attorney, Agent, or Firm* — Baker Hughes Patent Organization

(57) ABSTRACT

The method is used for uniforming temperature in a shaft supported by a fluid bearing during rotation of the shaft; a journal portion of the shaft is located inside the fluid bearing; at least one passage is provided inside the shaft at least along the journal portion so to cross it; at least one flow of heat-exchange fluid is established in the at least one passage; the method allows to overcome the problems due to the (Continued)

"Morton effect". A bearing system implementing the method is advantageously used in a turbomachine.

14 Claims, 4 Drawing Sheets

(51) Int. Cl.
    *F16C 33/10*     (2006.01)
    *F16C 17/02*     (2006.01)

(56) References Cited

U.S. PATENT DOCUMENTS

| | | | |
|---|---|---|---|
| 2,440,890 A * | 5/1948 | Birmann | F01D 25/164 |
| | | | 384/320 |
| 2,893,703 A * | 7/1959 | Richardson | F01D 25/125 |
| | | | 165/134.1 |
| 4,896,975 A | 1/1990 | Bescoby et al. | |
| 5,102,305 A | 4/1992 | Bescoby | |
| 5,518,321 A * | 5/1996 | Hata | F16C 33/108 |
| | | | 384/311 |
| 5,715,116 A | 2/1998 | Moritan et al. | |
| 9,261,104 B2 * | 2/2016 | Stock | F04D 25/06 |
| 2007/0006445 A1 * | 1/2007 | Down | F16C 3/02 |
| | | | 29/596 |
| 2015/0043848 A1 | 2/2015 | Grosso | |

FOREIGN PATENT DOCUMENTS

| | | |
|---|---|---|
| CN | 101268282 A | 9/2008 |
| CN | 103104604 A | 5/2013 |
| CN | 103650047 A | 3/2014 |
| CN | 104583619 B | 12/2017 |
| EP | 2 055 971 A1 | 5/2009 |
| GB | 2 024 330 A | 1/1980 |
| GB | 2 326 694 A | 12/1998 |
| JP | H05-298813 A | 11/1993 |
| WO | 2013/190463 A1 | 12/2013 |
| WO | 2014/117196 A1 | 8/2014 |
| WO | 2014/174013 A1 | 10/2014 |
| WO | 2015/002924 A1 | 1/2015 |
| WO | 2015002924 A1 | 1/2015 |

OTHER PUBLICATIONS

Italian Search Report and written Opinion issued in connection with corresponding IT Application No. 102015000055511 dated May 26, 2016.

International Search Report and Written Opinion issued in connection with corresponding PCT Application No. PCT/EP2016/072684 dated Nov. 11, 2016.

International Preliminary Report on Patentability issued in connection with corresponding PCT Application No. PCT/EP2016/072684 dated Mar. 27, 2018.

* cited by examiner

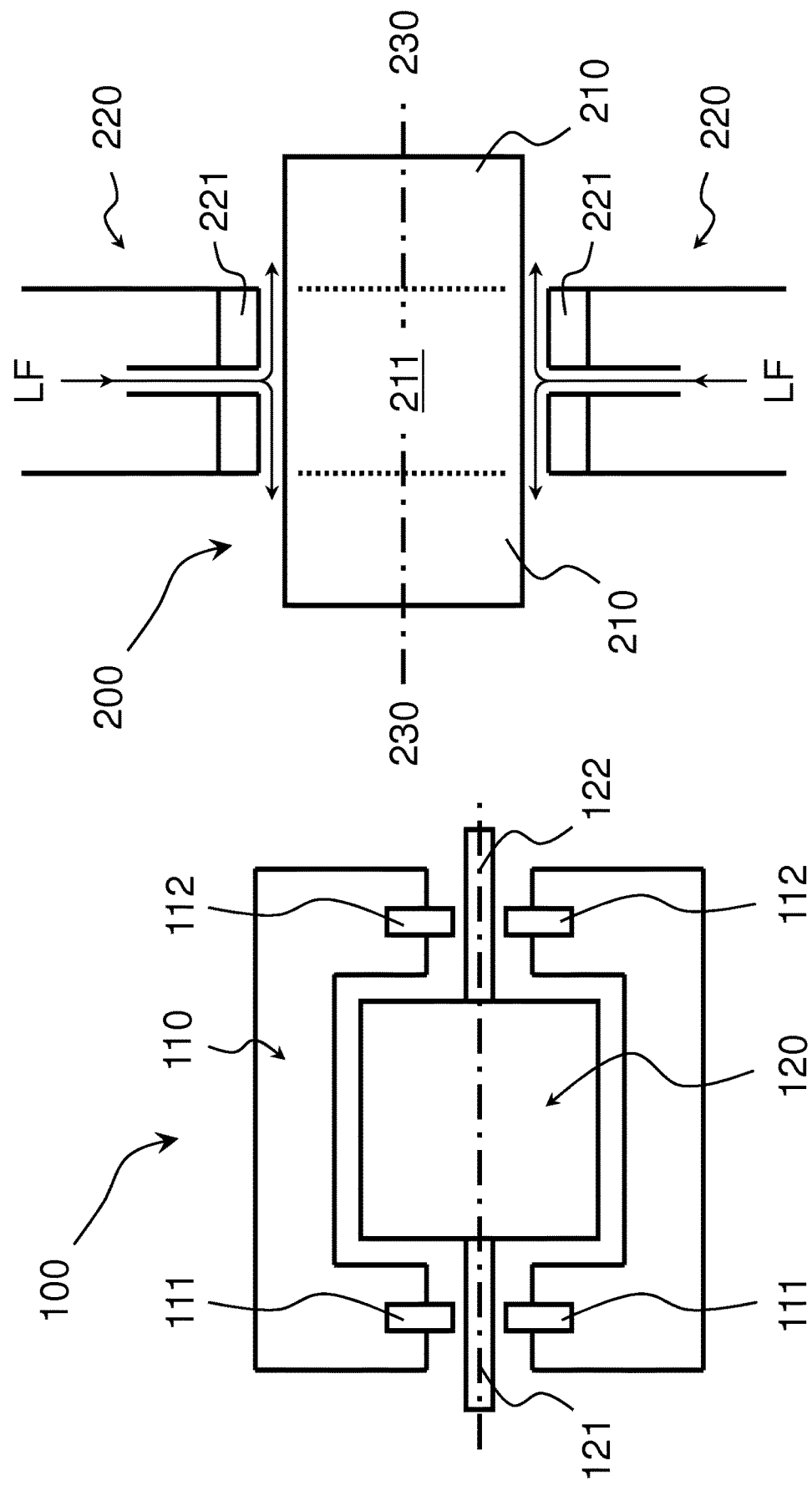

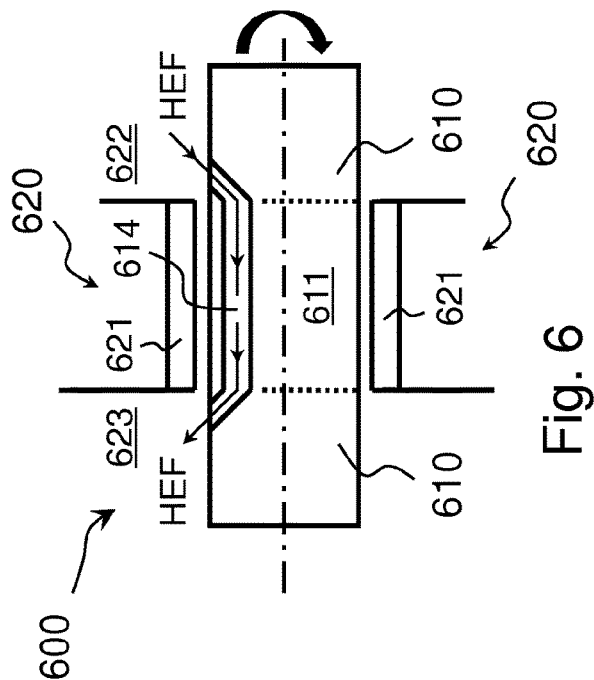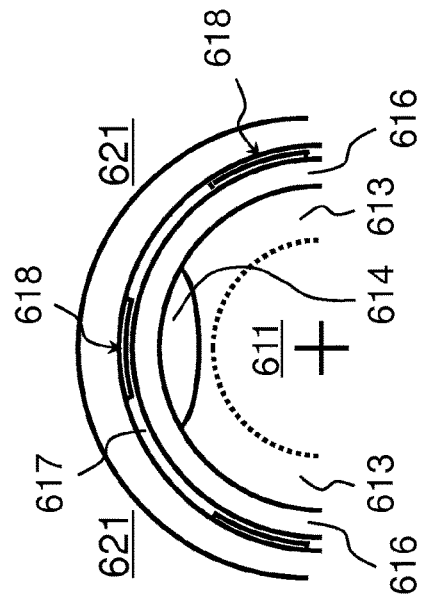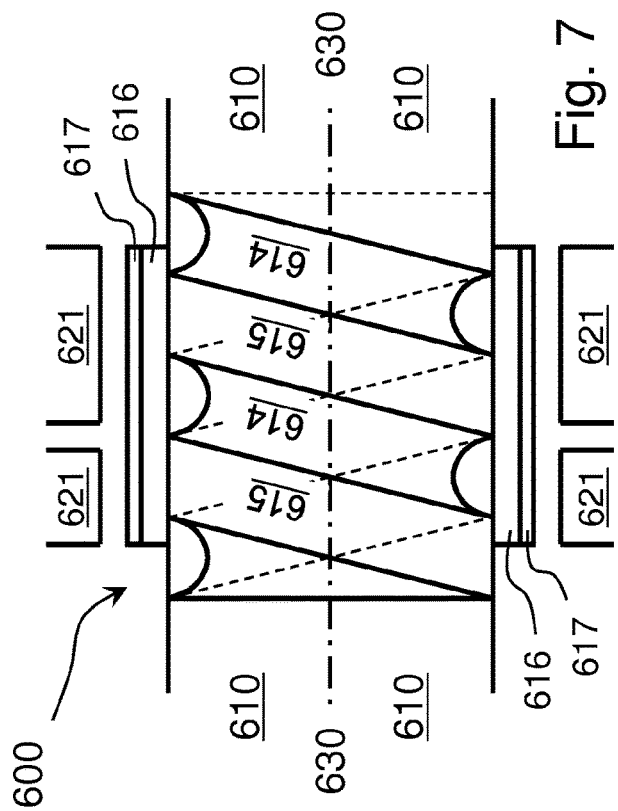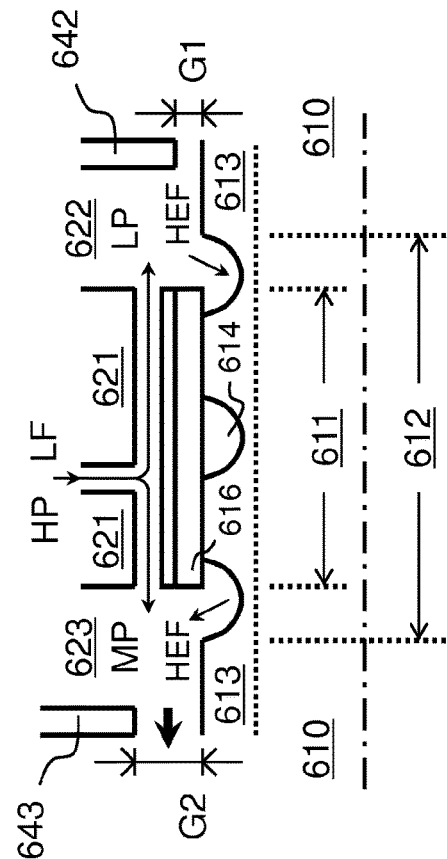

METHOD FOR UNIFORMING TEMPERATURE IN A SHAFT SUPPORTED BY A FLUID BEARING, BEARING SYSTEM AND TURBOMACHINE

TECHNICAL FIELD

Embodiments of the subject matter disclosed herein correspond to methods for uniforming temperature in a shaft supported by a fluid bearing, bearing systems and turbomachines.

BACKGROUND OF THE INVENTION

The rotor of a rotary machine is rotatably supported by specific devices; in particular, the shaft of the machine is supported by one or more bearings.

FIG. 1 schematically shows a turbomachine 100 comprising a stator 110 and a rotor 120. For example, the rotor 120 has a rotary shaft with a first shaft end-portion 121 protruding from a first side and a second shaft end-portion 122 protruding from a second side, and the stator 110 has a first fluid bearing 111 rotatably supporting the first shaft end-portion 121 and second fluid bearing 112 rotatably supporting the second shaft end-portion 122.

There are several types of "fluid bearings" (also known as "fluid-film bearings" that can be broadly classified into two types: "fluid dynamic bearings" and "hydrostatic bearings"): plain bearings, lemon bearings, tilting-pads bearings, etc.

FIG. 2 schematically shows a plain fluid bearing system 200 according to the prior art. It comprises a rotary shaft 210 (partially shown in FIG. 2) with a journal 211 (corresponding to an axial portion of the shaft that is delimited by two dotted lines in FIG. 2), and a plain fluid bearing 220; the journal 211 is located inside the bearing 220. The bearing 220 has a cylindrical bearing pad 221 (in this case, the "pad" is often called "bush" due to its cylindrical shape) around the journal 211, and there is a small gap between the pad 221 and the journal 211 around the journal 211. During rotation of the shaft 210, a lubricant fluid LF is injected between the pad 221 and the journal 211 so to avoid contact and reduce friction; the lubricant fluid LF typically flows from the middle (sometimes the center as in FIG. 2) of the pad 221 to the two sides of the bearing 220.

FIG. 2 shows a theoretical (that may be considered ideal) situation wherein the axis of the shaft 210 and the axis 230 of the journal seat of the bearing 220 coincide; in this case, the gap between the pad 221 and the journal 211 is uniform all around the journal 211.

Anyway, in a rotary machine during rotation of the shaft 210, the two axes do not coincide: they may be distant and/or inclined between each other.

By way of example, FIG. 3 shows four successive positions of the journal 211 inside the pad 221 as the shaft 210 rotates about its axis; the journal 211 makes a rotation movement about its axis and an orbital movement about the axis 230 of the bearing; starting from the position in FIG. 3A, the journal makes a rotation movement of 90° clockwise and an orbital movement of 90° clockwise and reaches the position of FIG. 3B, then the journal makes a rotation movement of 90° clockwise and an orbital movement of 90° clockwise and reaches the position of FIG. 3C, then the journal makes a rotation movement of 90° clockwise and an orbital movement of 90° clockwise and reaches the position of FIG. 3D.

In this case, the gap between the pad 221 and the journal 211 is non-uniform; in particular, if a point A on a diameter D of the journal 211 is considered, the distance between the point A and the pad 221 remains the same (or does not change much) at any time; this means that the temperature of the journal in the region of point A will be higher than the temperature in e.g. an opposite region of the journal.

FIG. 4 shows an exemplary simplified temperature plot along diameter D of the journal 211: at a first end E1 (close to point A) of the diameter D there is a high temperature T1, at a second end E2 (remote from point A) of the diameter D there is a low temperature T2; this temperature plot is a perfectly straight segment; more realistically, the temperature plot is a slightly curved segment. Such non-uniform temperature distribution inside the journal causes bending of the shaft at the journal and synchronous rotor vibrations, i.e. the so-called "Morton Effect"; under certain conditions, especially in high-speed turbomachines, it can lead to synchronous rotor instability.

In order to overcome such problem, document WO2015002924A1 teaches to arrange a tubular body around the shaft at the journal; the tubular body comprises a thermal barrier that absorbs at least a portion of heat generated by the rotation of the shaft. In this way, non-uniformity reduction depends on the width and the material of the thermal barrier.

BRIEF DESCRIPTION OF THE INVENTION

Therefore, there is a general need for avoiding non-uniform temperature distribution inside a shaft journal supported by a fluid bearing, or at least reducing non-uniformity considerably.

This need is particularly high for turbomachines such as those used in the field of "Oil & Gas", i.e. machines used in plants for exploration, production, storage, refinement and distribution of oil and/or gas.

It is to be noted that a non-uniform temperature distribution like the one shown in FIG. 5, does not cause bending of the shaft at the journal and synchronous rotor vibrations; this temperature plot along diameter D is symmetric with respect to the axis of the journal (for example, the temperatures at the first end E1 and at the second end E2 are equal to T4 and the temperature T5 at the axis is slightly lower than the temperature T4); this temperature plot is exaggerated as, more realistically, it should be a slightly curved segment.

An important idea behind the present invention is to have a rather uniform temperature at least in a radially peripheral region of the shaft journal. This may be achieved by transferring heat from parts of this region subject to high heating to other parts of this region subject to lower heating.

Embodiments of the subject matter disclosed herein relate to a method of uniforming temperature in a shaft supported by a fluid bearing during rotation of the shaft, a journal portion of the shaft being located inside the fluid bearing, in particular in front of pad or pads of the fluid bearing.

According to such embodiments, at least one passage is provided inside the shaft at least along the journal portion so to cross it, and at least one flow of heat-exchange fluid is established in the at least one passage.

Some embodiments of the subject matter disclosed herein relate to a bearing system.

According to such embodiments, the bearing system comprises a fluid bearing and a shaft with a journal portion located inside the fluid bearing, in particular in front of pad or pads of the fluid bearing; the journal portion comprises at least one passage extending at least from a first side of the fluid bearing to a second side of the fluid bearing; the or each passage is arranged for a flow of a heat-exchange fluid during rotation of the shaft across the journal.

Other embodiments of the subject matter disclosed herein relate to a turbomachine.

According to such embodiments, the turbomachine comprises at least one specific type of bearing system; such bearing system comprises a fluid bearing and a shaft with a journal portion located inside the fluid bearing, in particular in front of pad or pads of the fluid bearing; the journal portion comprises at least one passage extending at least from a first side of the fluid bearing to a second side of the fluid bearing; the or each passage is arranged for a flow of a heat-exchange fluid during rotation of the shaft across the journal.

BRIEF DESCRIPTION OF DRAWINGS

The accompanying drawings, which are incorporated herein and constitute an integral part of the present specification, illustrate exemplary embodiments of the present invention and, together with the detailed description, explain these embodiments. In the drawings:

FIG. 1 shows schematically a turbomachine with bearing systems,

FIG. 2 shows schematically a bearing system according to the prior art,

FIG. 6 shows, in a very schematic way, an embodiment of a bearing system according to an embodiment of the present invention (in this figure a thin sleeve around the shaft at the journal is not shown even if present), FIG. 7 shows, in a more detailed way, the embodiment of FIG. 6, FIG. 8 shows a partial longitudinal cross-section of the embodiment of FIG. 6, and FIG. 9 shows a partial transversal cross-section of the embodiment of FIG. 6.

DETAILED DESCRIPTION

The following description of exemplary embodiments refers to the accompanying drawings.

The following description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 3A:
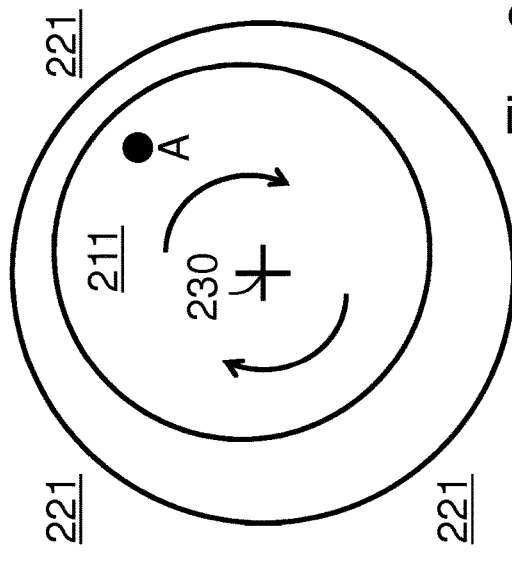
FIG. 3 including FIG. 3A, FIG. 3B, FIG. 3C
FIG. 3D shows four positions of the shaft journal inside the bearing pad in the bearing system of FIG. 2.
Figure 3B:
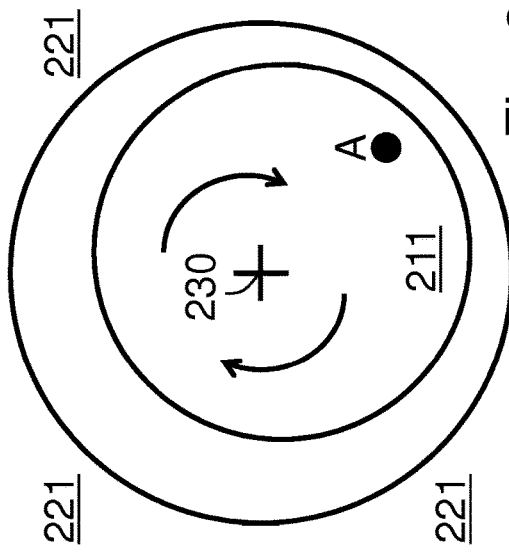
Figure 3D:
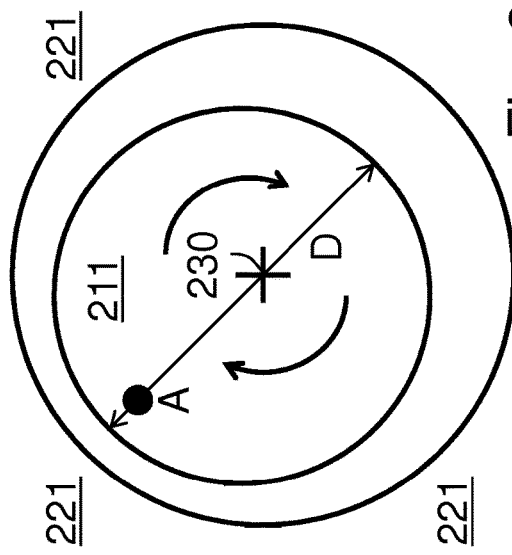
Figure 3C:
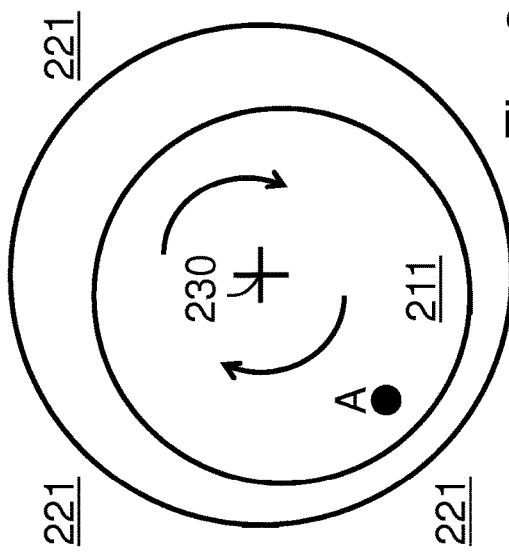
Figure 4:
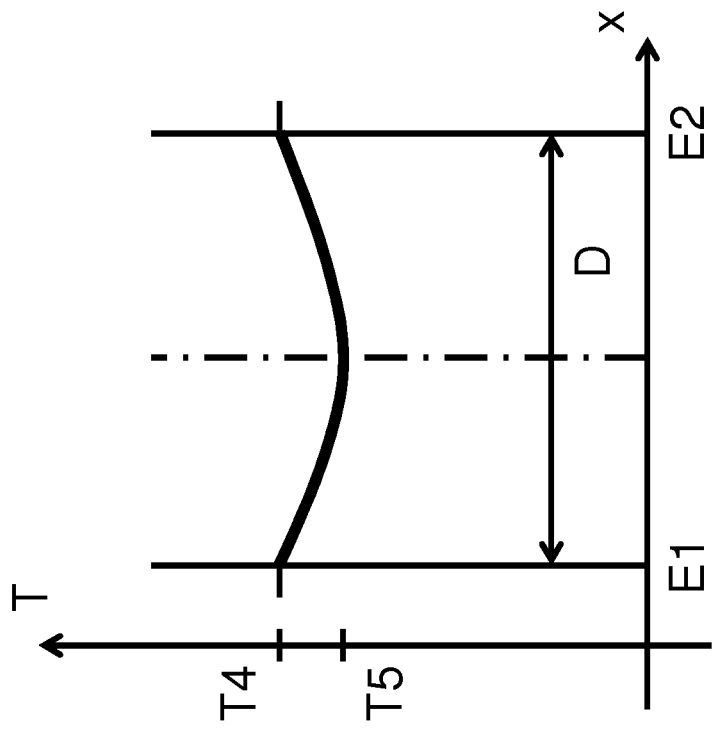
FIG. 4 shows an exemplary (simplified) temperature plot inside the shaft journal in the bearing system of FIG. 2.

As already explained with the help of FIG. 4, a journal portion of a rotating shaft located inside a fluid bearing is subject to non-uniform heating; the journal portion is a portion of the shaft facing the pad or pads fluid bearing; in other words, some parts, i.e. first parts, of the journal portion heat more than other (different) parts, i.e. second parts, of the journal portion; therefore, during rotation, the first parts reach certain temperatures and the second parts reach lower temperatures. Such heat develops in the fluid of the bearing (a lubricant fluid LF) in the gap between the journal portion (211 in FIGS. 2 and 611 in FIG. 6) of the shaft and, usually, pads (221 in FIGS. 2 and 621 in FIG. 6) of the bearing.

A way to reduce non-uniformity is to remove heat from the first parts of the journal portion and to provide the removed heat somewhere else. In particular, a way to reduce non-uniformity is to remove heat from the first parts of the journal portion and to provide the removed heat to the second (different) parts of the journal portion. Accordingly, heat is transferred from the first parts of the journal portion.

With reference to FIG. 6, a method of uniforming temperature in a shaft 610 rotatably supported by a fluid bearing 620 during rotation of the shaft 610, a journal portion 611 of the shaft 610 being located inside the fluid bearing 620, in particular in front of the pad or pads of the fluid bearing, provides that:

at least one passage 614 is provided inside the shaft 610 at least along the journal portion 611 so to cross it, at least one flow of a heat-exchange fluid HEF is established in the at least one passage 614.

The heat-exchange fluid and the passage are used to transfer heat; during its flow, the heat-exchange fluid receives heat from and/or transmits heat to the walls of the passage and, consequently, from and/or to the material of the journal portion surrounding the walls of the passage.

It is to be noted that part of the heat received by the heat-exchange fluid may remain in the fluid and result in an increased temperature of the fluid at the outlet of the passage.

In the embodiment of FIGS. 6, 7, 8 and 9, passage 614 develops along the journal portion 611 and slightly beyond in FIG. 8, the line labelled 611 corresponds to the axial length of the journal portion and the line labelled 612 corresponds to the axial length of the passage 614; in this way, it is in fluid communication both with a first space 622 (see FIG. 6 and FIG. 8) on a first side of the bearing 620, and a second space 623 (see FIG. 6 and FIG. 8) on a second side of the bearing 620.

Differently from the embodiment of FIGS. 6, 7, 8 and 9, a plurality of passages may be useful for a more effective transfer of heat, even if this might be more complicated and/or expensive from the manufacturing point of view; for example, the plurality of passages may consist of two or three or four or five or six or seven or eight or more passages. In one embodiment, the passages are separate and the flows of heat-exchange fluid inside them are equally separate; in any case, the flows of heat-exchange fluid may start from a same container (e.g. the first space 622 in FIG. 6 and FIG. 8 on the first side of the bearing 620) and end into a same container (e.g. the second space 623 in FIG. 6 and FIG. 8 on the second side of the bearing 620).

The purpose of the heat-exchange fluid and the passage (or passages) is to have a rather uniform temperature at least in a radially peripheral region of the shaft journal portion (the cross-section of such region is an annulus see 613 in FIG. 8 and FIG. 9).

Figure 5:
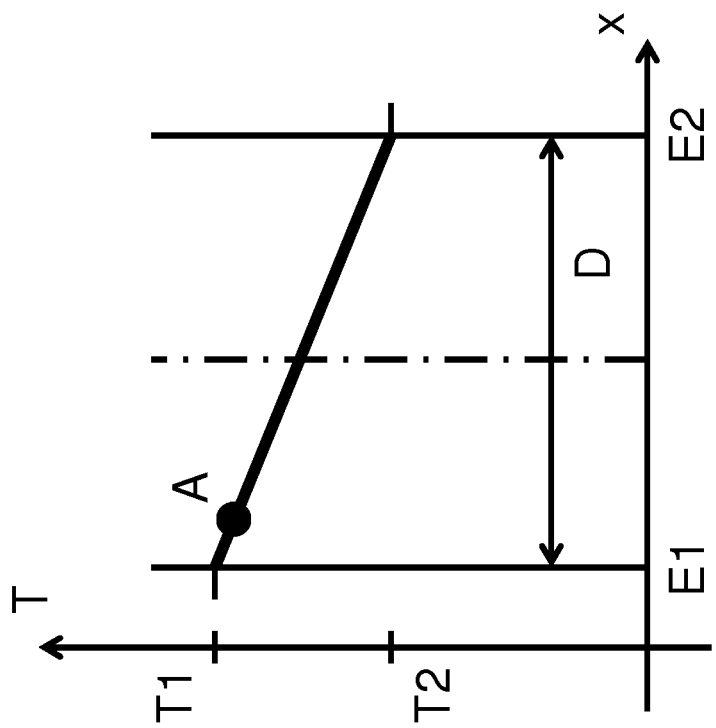
FIG. 5 shows an exemplary (exaggerated) temperature plot inside a shaft journal according to an embodiment of the present invention.

As already explained with the help of FIG. 5, that is an exemplary exaggerated temperature plot, in order to avoid bending of the shaft, perfect temperature uniformity is not necessary; what is important is to achieve circumferential uniformity (i.e. each point of any circumference being at the same temperature) as in FIG. 5 (or at least a good degree of circumferential uniformity), while radial non-uniformity may be accepted (i.e. points of any radius being at different temperatures) as in FIG. 5.

The or each passage is in one embodiment helix-shaped (i.e. not straight and parallel to the axis of the shaft) as shown in FIG. 7 and FIG. 8; in this way, heat may be distributed all around the journal portion; in particular, heat from parts of the journal portion that tend to be hotter (for example at a certain angular position of the journal portion) may be transferred to parts of the journal portion that tend to be colder (for example at an angular position distant of e.g. 90° or 180° from the certain angular position).

The or each helix-shaped passage is shaped and sized so that it provides a pumping action on the heat-exchange fluid as in the embodiment of FIGS. 6, 7, 8 and 9; in this case, no other device will be necessary to start and maintain the flow or flows of heat-exchange fluid inside the passage or passages.

The or each passage develops in one embodiment in a radially peripheral region of the journal portion as in the embodiment of FIGS. 6, 7, 8 and 9; in these figures, the peripheral region is labelled 613.

A simple and effective way of forming the or each passage is through milling grooves on and in the lateral surface of the shaft at the journal portion, and covering them with e.g. a sleeve; in this way (or through equivalent manufacturing steps), the or each passage is defined by a corresponding groove and by a sleeve as in the embodiment of FIGS. 6, 7, 8 and 9 wherein the groove is labelled 614 and the sleeve is labelled 616.

The sleeve (see label 616 in e.g. FIG. 8) may also be used for providing thermal insulation between a lubricant fluid (see label LF in FIG. 8) of the fluid bearing and the shaft journal portion (see label 611 in e.g. FIG. 8); in this way, as heat is hindered from flowing in the radial direction and penetrating into the journal portion, the amount of any temperature non-uniformity is highly reduced. According to such embodiments, temperature uniformity derives from the synergic combination of (high) thermal convection and (low) thermal conduction.

The sleeve (see label 616 in e.g. FIG. 8) may also be used for guiding a lubricant fluid (see label LF in FIG. 8) of the fluid bearing.

Although the heat-exchange fluid and the lubricant fluid of the fluid bearing might be two different fluids, it is very advantageous that at least a portion of the lubricant fluid (see label LF in FIG. 8) of the fluid bearing is used as the heat-exchange fluid (see label HEF in FIG. 6 and FIG. 8) as this simplifies the structure of the bearing system.

The embodiment of FIGS. 6, 7, 8 and 9 allows to achieve a high degree of temperature uniformity in the journal portion.

The bearing system 600 comprises a fluid bearing 620 with a (cylindrical) pad 621 and a shaft 610 with a journal portion 611 located inside the bearing 620, specifically inside the pad 621; an axis of the bearing is labelled 630 (see e.g. FIG. 7), and in the figures the shaft 610 (as well as the journal portion 611) is shown in its theoretical position wherein its axis coincides with the axis of the bearing.

It is to be noted that when a "pad" has a cylindrical shape, it is often called "bush".

The journal portion 611 comprises only one internal passage 614 extending at least from a first side 622 of the bearing 620 to a second side 623 of the bearing 620; alternative embodiments may comprise more than one passage. The passage 614 is arranged for a flow of a heat-exchange fluid HEF during rotation of the shaft 610 across the journal portion 611, in particular from the side 622 to the side 623.

The passage 614 is helix-shaped and develops in a radially peripheral region 613 of the journal portion 611. The passage 614 comprises a number of turns about the axis 630 of the shaft 610; this number may be in the range from 0.1 to 10.0, in one embodiment from 0.25 to 4.0, more particularly from 0.5 to 2.0; in the embodiment of the figures, the passage 614 consists of two turns. The pitch of the or each passage 614 is equal to a number of times the axial length of the fluid bearing 620 (corresponding to the axial length of the journal portion 611); this number may be in the range from 10.0 to 0.1, in one embodiment from 4.0 to 0.25, more particularly from 2.0 to 0.5; in the embodiment of the figures, this number is a bit less than 2, about 1.8. A small pitch of the helix, i.e. many turns in the passage, leads to high uniformity but causes high fluid load loss, i.e. high pressure drop, along the passage. As can be seen in the figures, a recessed surface of the passage 614 is separated by a surface 615 of the journal portion 611 at the same level as the surface of the shaft 610 on both sides of the journal portion 611 (see e.g. FIG. 7 and FIG. 8). The depth of the or passage is in one embodiment in the range of from 0.1 mm to 10.0 mm, more particularly in the range from 2.0 mm to 5.0 mm.

The bearing system 600 of the embodiment of FIGS. 6, 7, 8 and 9, further comprises a sleeve 616 at the journal portion 611 and at least one groove on the surface of the journal portion 611 covered by the sleeve 616; in this way, the passage 614 is laterally delimited by the groove and the sleeve 616.

The sleeve 616 is entirely covered by a layer 617 of thermally insulating material. Alternatively, the sleeve may be made of thermally insulating material. In this way, heat is hindered from flowing in the radial direction and penetrating into the journal portion.

The sleeve 616 is entirely covered by a layer 617 having an outer surface with protrusions and/or recesses 618 (in an embodiment having a height/depth in the range of from 0.01 mm to 0.1 mm). Alternatively, the sleeve may have an outer surface with protrusions and/or recesses (in an embodiment having a height/depth in the range of from 0.01 mm to 0.1 mm). In this way, the sleeve may also be used for guiding a lubricant fluid of the fluid bearing. For example, such protrusions and/or recesses may be herringbone-shaped. It is to be noted that protrusions and/or recesses may be on the outer surface of the sleeve 616 or its covering layer 617 and/or on the inner surface of the bearing pad 621.

The sleeve 616 may be made of steel, may have a width of 10-50 mm (its external diameter may be 10-15% bigger than its internal diameter), may have a length of 0.4-1.0 times the diameter of the bearing pad or the shaft journal portion. It may be shrink fit on the shaft at the journal portion.

The layer 617 is made of thermally insulating material, in particular PEEK (=Poly Ether Ether Ketone) or PTFE (=Poly Tetra Fluoro Ethylene), may have a width of 0.1-1.0 mm, may have a length of 0.4-1.0 times the diameter of the bearing pad or the journal portion. It may be applied (for example deposited) on the sleeve before mounting the sleeve on the shaft.

In the embodiment of FIGS. 6, 7, 8 and 9, a lubricant fluid LF is injected between the bearing pad 621 and the covering layer 617 of the sleeve 616 (see FIG. 8) so to avoid contact and reduce friction; injection is at a suitable position or positions of pad 621, not necessarily in the center of the pad 621. The lubricant fluid LF flows between the pad 612 and the layer 617 (i.e. is guided by the layer 617) toward both sides of the bearing 620, specifically into a first space 622 (see FIG. 8) on a first side of the bearing 620, and a second space 623 (see FIG. 8) on a second side of the bearing 620. The first space 622 is axially delimited by a first wall 642 having a first hole with a small first gap G1 separating the shaft 610; the size of the first hole, i.e. the width of the first gap G1, is sufficient to allow rotation of the shaft 610 in any operating condition; minor drainage of the lubricant fluid LF occurs through the first gap G1. The second space 623 is axially delimited by a second wall 643 having a second hole with a large second gap G2 separating the shaft 610; the size of the second hole, i.e. the width of the second gap G1, is designed to allow rotation of the shaft 610 in any operating condition and for drainage of the lubricant fluid LF through the second gap G2 (see the arrow in FIG. 8). Almost all the lubricant fluid LF that enters the space 622 from the pad 621 exits the space 622 through the passage 614 thus becoming the heat-exchange fluid HEF; the passage 614 pumps the heat-exchange fluid HEF and makes it flow from space 622 to space 623 (a pressure increase occurs) along its two turns; the heat-exchange fluid HEF that enters the space 623 from the passage 614 and the lubricant fluid LF that enters the space 623 from the pad 621 exit the space 623 through the second gap G2. Typically, the fluid is at high pressure HP upstream the pad 621, is at low pressure LP in space 622 and is at medium pressure MP in space 623. The flows of the fluids in the various points of the bearing system 600 depend on a number of geometrical and physical parameters of the bearing system.

A bearing system according to an embodiment of the present invention, for example identical or similar to the one of FIGS. 6, 7, 8 and 9, may advantageously be used in a turbomachine, for example a turbomachine identical or similar to the one of FIG. 1, in order to reduce machine vibrations, in particular to avoid the risk of rotor instability.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A method of uniforming temperature in a shaft supported by a fluid bearing during rotation of the shaft, a journal portion of the shaft being located in front of pad or pads of the fluid bearing, the method comprising:
   providing at least one groove etched on a surface of the journal portion, wherein the at least one groove is covered by a sleeve to define at least one helix-shaped passage that extends across the axial length of the journal portion, the sleeve covered by a thermally insulating layer disposed on a radially outward facing surface of the sleeve; and
   establishing at least one flow of a heat-exchange fluid in the at least one passage.

2. The method of claim 1, wherein a plurality of flows of a heat-exchange fluid is correspondingly established in the plurality of passages.

3. The method of claim 1, wherein a pumping action on the heat-exchange fluid is provided by the at least one helix-shaped passage.

4. The method of claim 1, wherein the at least one helix-shaped passage develops in a radially peripheral region of the journal portion.

5. The method of claim 1, wherein the sleeve is shrink fitted on the shaft at the journal portion.

6. The method of claim 1, wherein the sleeve is used for providing thermal insulation between a lubricant fluid of the fluid bearing and the journal portion.

7. The method of claim 1, wherein the sleeve is used for guiding a lubricant fluid of the fluid bearing.

8. The method of claim 1, wherein a portion of a lubricant fluid of the fluid bearing is used as the heat-exchange fluid.

9. A bearing system comprising
   a fluid bearing comprising at least one pad;
   a shaft with a journal portion located in front of the at least one pad of the fluid bearing;
   a sleeve arranged at said journal portion and covered by a thermally insulating layer disposed on a radially outward facing surface of the sleeve; and
   at least one groove etched on a surface of the journal portion, wherein the at least one groove is covered by the sleeve to define at least one helix-shaped passage that extends across the axial length of the journal portion from a first side of the fluid bearing to a second side of the fluid bearing, the at least one passage arranged to conduct a flow of a heat-exchange fluid during rotation of the shaft across the journal.

10. The bearing system of claim 9, wherein the at least one helix-shaped passage formed in a radially peripheral region of the journal portion.

11. The bearing system of claim 10, wherein the at least one helix-shaped passage comprises a number of turns about the axis of the shaft, the number of turns being in the range from 0.1 to 10.0.

12. The bearing system of claim 10, wherein a pitch of the at least one helix-shaped passage is equal to a number of times the axial length of the journal portion of the fluid bearing, the number of times being in the range from 10.0 to 0.1.

13. The bearing system of claim 9 wherein the sleeve is shrink fitted on the shaft at the journal portion.

14. A turbomachine comprising at least one bearing system according to claim 9.

* * * * *